Patented July 14, 1925.

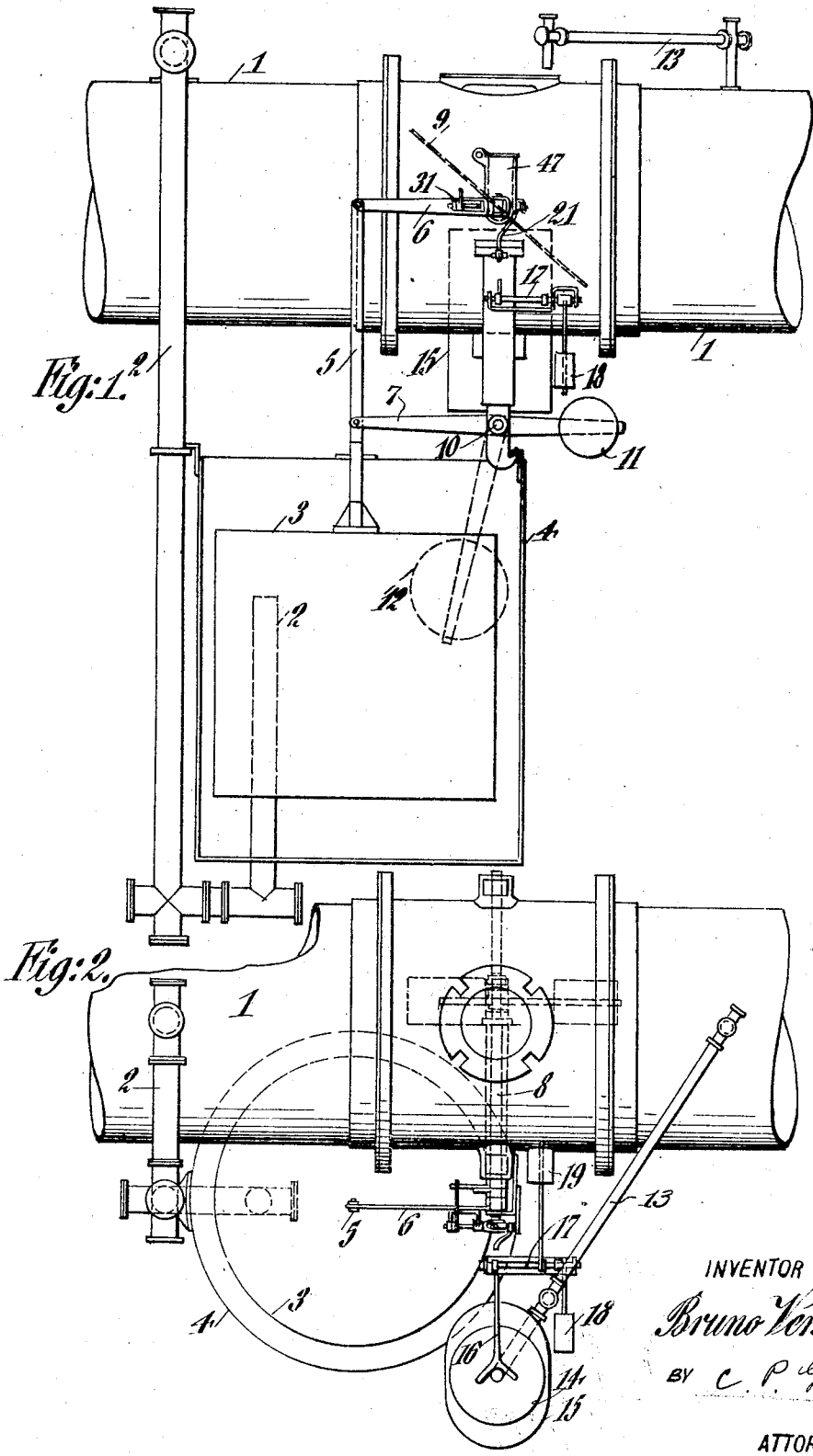

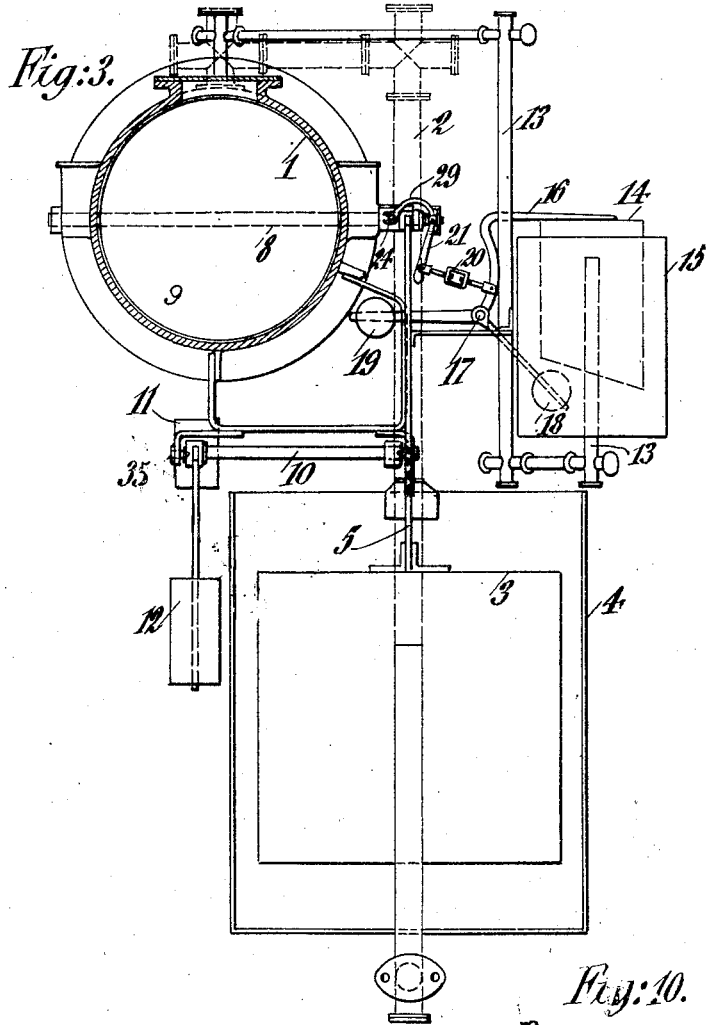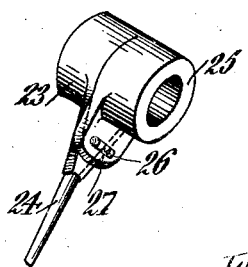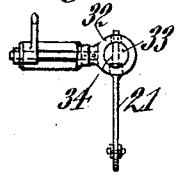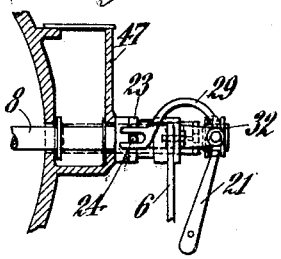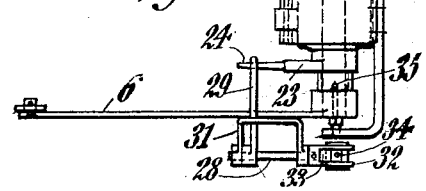

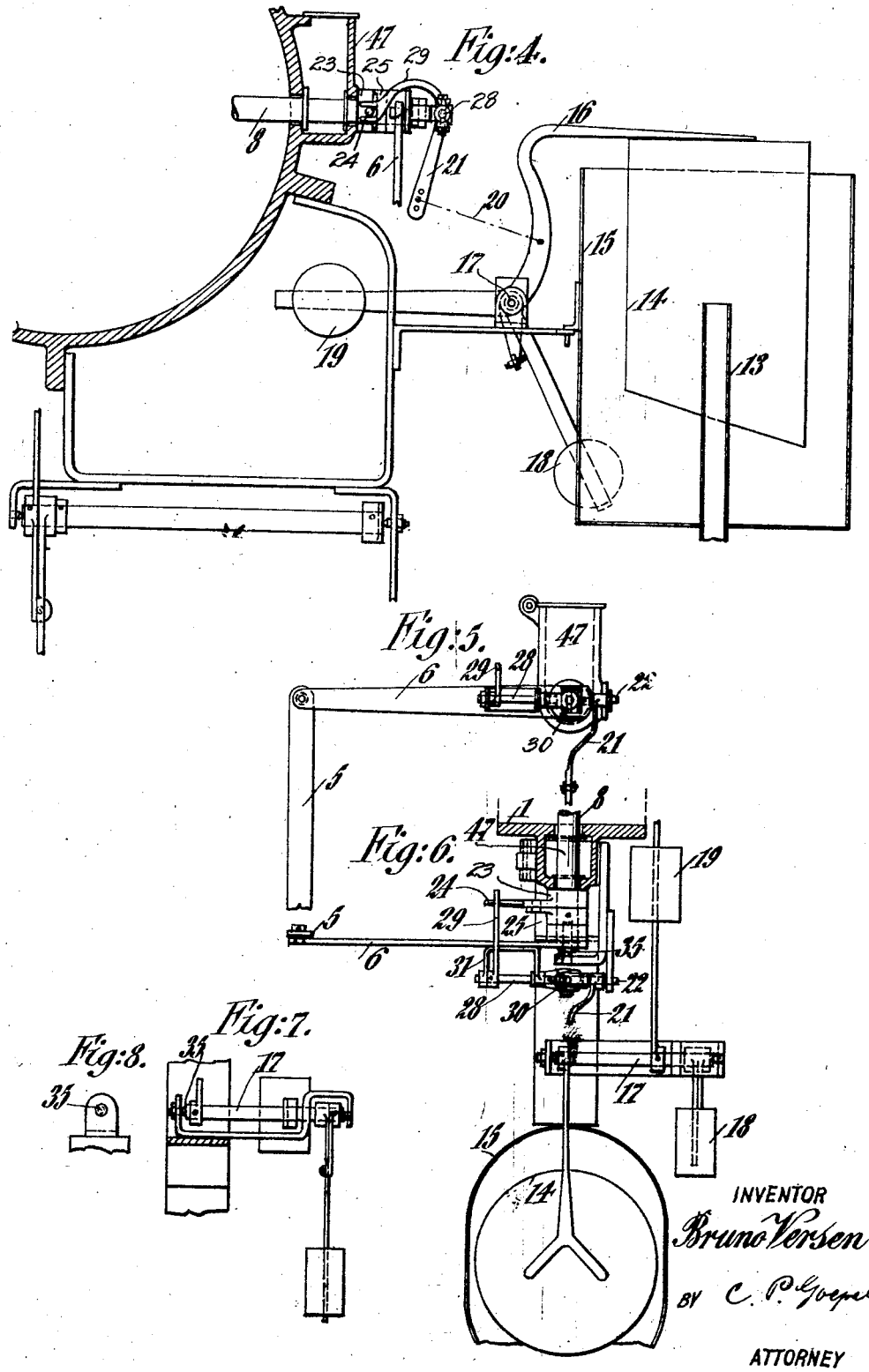

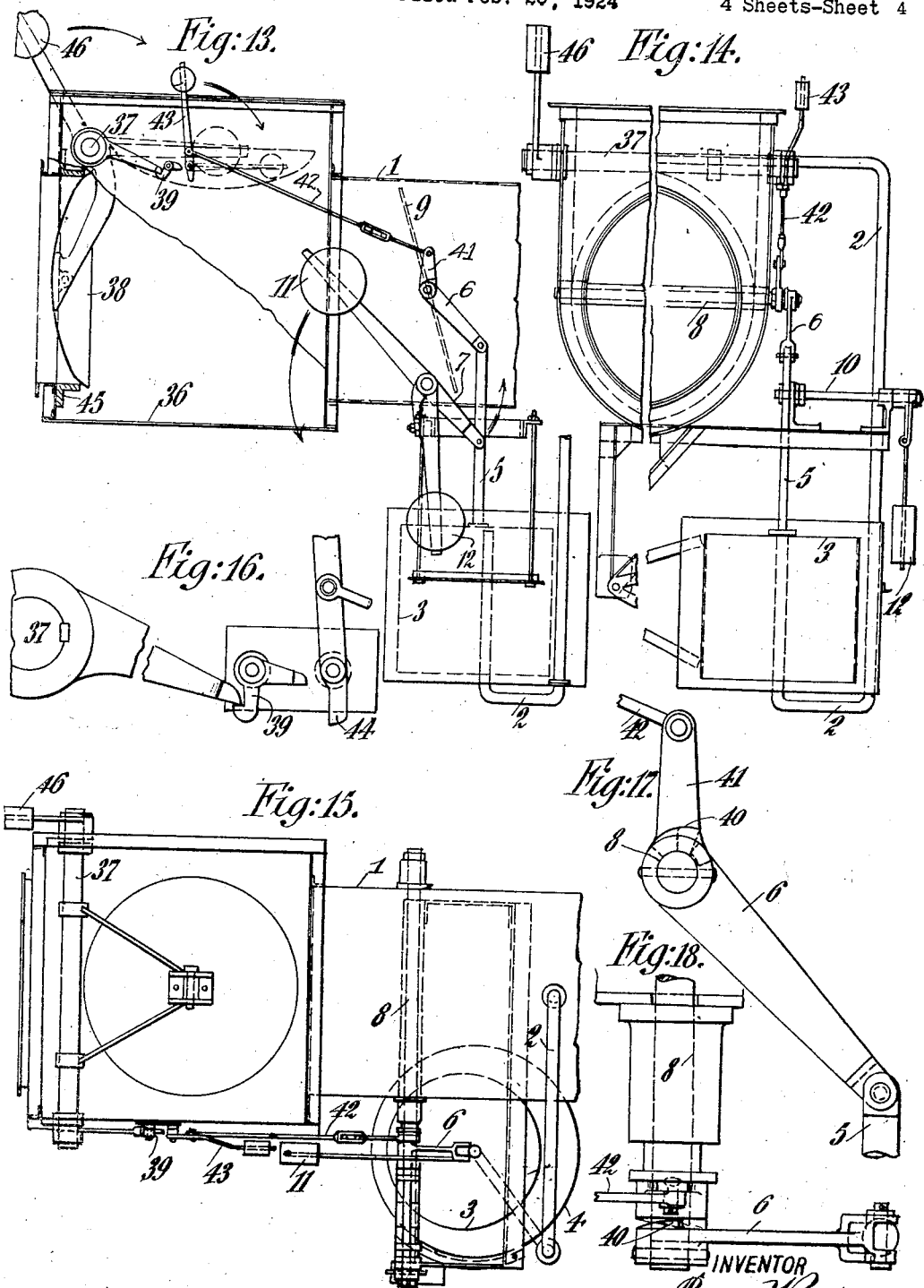

1,546,154

UNITED STATES PATENT OFFICE.

BRUNO VERSEN, OF DORTMUND, GERMANY.

DEVICE FOR REGULATING THE PRESSURE AND AMOUNT OF GAS PRESENT IN, AND PASSING THROUGH, A CONDUIT.

Application filed February 25, 1924. Serial No. 694,911.

*To all whom it may concern:*

Be it known that I, BRUNO VERSEN, a citizen of the German Republic, and resident of Dortmund, Germany, have invented a new and useful Improved Device for Regulating the Pressure and Amount of Gas Present In, and Passing Through, a Conduit, of which the following is a specification.

The gist of the invention consists in the feature that an inverted submerged vessel, the interior of which is subjected to the pressure of the gas contained in the conduit or pipe to be regulated is balanced by oppositely acting means in such a way that the varying buoyancy of the controlling inverted submerged vessel is opposed in every position as brought about by the pressure of the gas, by a counter-pressure of an equal height. This regulation is divided into a coarse-regulation and a fine-regulation, both affecting the same regulating member, and if the pressure falls below a certain predetermined and adjustable lowest height, the conduit or pipe is shut off automatically in order to prevent an explosion.

My improved method is carried into effect with the aid of a device as shown, by way of example, in the accompanying drawings. In these latter, Figure 1 is in its upper part a side-view and in its lower part a vertical section of the device; Figure 2 is a plan of the parts shown in Figure 1; Figure 3 is a cross-section of the same parts; Figure 4 shows the parts in the upper part of the righthand side of Figure 3 on an enlarged scale; Figure 5 is a view of the parts in the upper part of the lefthand side in Figure 4, seen from the right to the left of this figure; Figure 6 is a plan of the parts shown in Figure 4, the gas pipe (1) being omitted; Figures 7, 8, and 9 are details which are duly described hereinafter. Figures 10, 11, and 12, represent details of a modification of parts of the control-mechanism. Figure 13 is a side-view of the automatically shutting valve; Figure 14 is a vertical section of the parts shown in Figure 13, the plane of section being taken at right angles to Figure 13; Figure 15 is a plan of the parts shown in Figures 13 and 14, and Figures 16, 17 and 18 show also some details which are more fully referred to hereinafter.

Referring to Figures 1–9, 1 (Figs. 1–3) is the gas conduit or pipe, with respect to which the regulation is to be effected. A branch 2 connected with the top of the pipe 1 terminates in the interior of an inverted submerged vessel or bell 3 which floats in a receptacle 4 and is suspended from a vertical rod 5 connected with two arms 6 and 7, of which the first is connected with the axle 8 of the throttling-member 9 located in the pipe 1, whereas the arm 7 is connected with an axle 10, to which are affixed two weighted arms, one extending oppositely to the arm 7 and being furnished with the weight 11, the other extending obliquely and being furnished with the weight 12. These weights on the two arms may be adjusted accurately to the required counter-pressure and the weights secured in place by means of set screws or the like. By this compensation by the weights the buoyancy of the vessel or bell 3 is balanced in every height thereof by the corresponding angular movement of the weighted arm 7 whereby the throttling member is retained in its position.

It is to be noted that the arm with the adjustable weight 12 operates on the lever 7 and the bell and valve 9 so as to exert a pressure on the members tending to open the valve 9, and the arm with the weight 11 operates to exert an adjustable variable pressure in the reverse direction tending to close the valve 9. The pressure exerted by the two weights varies according to their angular position which depends on the relative position of the valve 9 in the conduit and these weights are adjustable to meet the varying conditions. In the event that the gas pressure in the conduit 1 is a heavy pressure, it is natural that the force exerted on the arm 7 tending to open the valve, should be greater than for light pressure of gas in the conduit and in case of such heavy pressure, the weight 12 is moved outwardly on the arm all the weight or force increased to meet the requirement of the heavy operating pressure. The weight 11 may be likewise adjusted in order to regulate the pressure and the amount of gas flowing through the conduit.

The means described in the latter part of the preceding paragraph serve for the coarse-regulation, viz. for the regulation of large differences of pressure, as occur for instance, frequently in the gas-plants of blast-furnaces and in coking-plants. That coarse-regulation is effectively assisted by the fine-regulation mechanism hereinafter described in which masses of less weight will more readily follow slight variations of the pressure. This mechanism comprises another inverted immersed vessel or bell 14 (Figures 2, 3, and 4), the interior of which is connected by a branch pipe 13 with the main gas pipe 1 so that it is under the pressure of the gas and is acted on thereby. The bell 14 is attached to an arm 16 affixed to an axle 17, to which are secured two weight arms or levers, of which one is approximately horizontal and furnished with the weight 19, whereas the other extends obliquely downwards and is furnished with the weight 18, this arrangement being thus practically the same as described with respect to the weighted levers connected with the first-mentioned bell. The vertical movements of the bell 14, or, in other words, the oscillations of the arm 16, are transmitted by an adjustable connecting rod 20 (Figs. 3 and 4) to an arm 21 keyed to an axle 22 (Figs. 5 and 6).

On the axle 8 of the throttling member 9 is located a movable sleeve 23 (Figures 6 and 9) having a radial extension or finger 24 which may be adjusted relatively to another sleeve 25 affixed to said axle, and may be firmly connected with said sleeve 25 by means of a threaded bolt 27 extending through a slot 26 provided in a lug of said second sleeve. The pin 24 is engaged by the forked end of a curved lever or arm 29 (Figs. 4 and 6) affixed to an axle 28 connected with the axle 22 (mentioned already at the end of the preceding paragraph by a universal joint 30 located coaxially with the axle 8 of the throttling member 9. In order to combine the fine-regulation with the coarse regulation the arm 6 which forms a member of the coarse-regulation device is supported movably on the axle 8 (of the throttling member 9) and is provided with an angular member 31 forming the bearing for the axle 28 of the fine-regulation mechanism. Each angular movement of the arm 6 as caused by the coarse regulation of the device causes, therefore, a change of the position of the axle 28 and, thus, a shifting of the forked lever 29, whereby also the finger 24 is moved, together with the sleeves with which it is connected, while the fine-regulation mechanism moves the forked lever 29 connected to the axle 28 as described and changes in its turn the position of the finger 24 and, therefore, of the throttling member 9.

In the example illustrated in Figures 3 and 4, the bell 14 moves in a circular path, the axle forming the centre of the curve, but the arrangement and combination of these parts may also be such that the bell moves in a straight line, perfectly vertically, like the bell 3, and the transmission-member by which the arm 21 is actuated may be formed by a bell-crank lever.

In Figures 10, 11 and 12 a simplified form of construction of the connection between the arm 21 and the members actuating the finger 24 is shown. Here the head of the shaft 28 forms a universal joint 32, in the central member of which the cylindrical end 34 of the arm 21 is rotatably guided. In order to provide for an easy movability all important axles are supported on centres 35. The axle 8 of the throttling member 9 is loosely supported in the pipe 1 also on centres 35, and is packed near the wall of the pipe by dust or asbestos-wool or the like contained in boxes 47 (Figs. 1, 4, 6, 10).

The branch pipe 2 of the coarse-regulation device is preferably in advance of the throttling member 9, and the branch pipe 13 of the fine-regulation device is connected preferably beyond said member 9.

As it is possible that there is temporarily no gas in the pipe, and as in certain cases, for instance, in dwellings or in the neighbourhood of dwellings, an increased safety is required, the apparatus is provided with an automatically closing safety-device which is combined with the automatically operating pressure-regulating devices and securely prevents an explosion as it can be opened after the automatic closing only by an attendant who must observe certain precautions while effecting the re-opening of the gas pipe.

A safety device of this kind is illustrated in Figures 13 to 18. A box 36 is inserted in the gas pipe 1. One of the pipe parts projects into said box (Figure 13, lefthand), and here a closing member 38 formed, for instance, with a convex seating surface because of the effective seating of such a valve-head, is attached to an axle 37 supported in the upper part of said box. While the apparatus is in proper service, the closing member 38 is held horizontally in open position by a hook-shaped pawl 39. If the pressure of the gas in the pipe falls below a predetermined height for which the plant has been adjusted, the bell 3 of the coarse-regulation device sinks so much that the arm 6 moves along with it, by means of a lug 40 forming a part of it, a lever 41 supported movably on the axle 8 and being connected with a lever tilting pendulum 43 which is about in stable equilibrium and which then is moved out of this equilibrium whereafter it tilts and turns downwards, and a short thumb with which it is provided releases the pawl 39 whereby also the valve-disk is released and drops down on the axle 37 and contacts with the valve seat 45 in the box 34 against which it is then pressed by the now effective weight 46

If the valve box 36 is being built into an angular gas-pipe the valve disk can be caused to drop freely on the seat below it in order to shut off the passage.

The arrangements and combinations of parts described on the preceding pages answer all practical requirements in a simple and reliable manner; they allow of convenient care, operate entirely automatically and do not require repeated attendance even in what may be called rough plants. The devices can be constructed in larger or small dimensions, and the small devices may be so devised as to be portable, so as to permit to be detached from, and re-attached to, a conduit in the case of a repair or the like. With gas-furnaces and gas-engines the devices may be employed for regulating the gas, as well as the air, or both fluids.

I claim:

1. A device for regulating the pressure and amount of a gas present in and passing through a conduit provided with a control member, the combination of the respective conduit and its control member, with a member connected with said control member actuated by the gas pressure in the conduit for opening and closing said control member, means connected with said gas pressure actuated member providing an adjustable variable pressure tending to hold said control member open against the gas pressure acting thereon tending to close it, and a compensating member providing a variable pressure in the opposite direction to the last mentioned variable pressure means associated with said control member and gas pressure actuated member.

2. A device for regulating the pressure and the amount of a gas present in and passing through, a conduit provided with a control-member, the combination, of the respective conduit and its control-member, with an inverted submerged vessel, a communication between the interior thereof and said conduit, a pair of weighted arms arranged to compensate each other, and a connection between the arms and said vessel, said weighted arms being adapted to balance the pressure of the gas on said inverted submerged vessel.

3. A device for regulating the pressure and the amount of a gas present in, and passing through, a conduit provided with a control-member, the combination, of the respective conduit, with a throttling member therein, an inverted submerged vessel, a communication between the interior thereof and said conduit, a pair of weighted arms arranged to compensate each other, connections between the arms and said vessel, as well as with said throttling member, and another control-device for the throttling member, said weighted arms being adapted to effect the coarse-regulation, and said other control device being adapted to effect the fine-regulation of the said throttling member.

4. A device for regulating the pressure and the amount of gas present in, and passing through, a conduit provided with a control-member, the combination, of the respective conduits with a throttling-member therein, an inverted submerged vessel, a communication between the interior thereof and said conduit, means for balancing said vessel according to the gas-pressure within it, a coarse-regulation device, a guide-lever forming part thereof, a shaft supported on said guide-lever, a universal-joint inserted into said shaft, an inverted submerged vessel so arranged as to be adapted to control the said shaft, a forked lever connected with the latter a finger-lever attached to the shaft of said control-member and being adapted to be actuated by said forked lever, substantially, as set forth.

5. A device for regulating the pressure and the amount of gas present in, and passing through, a conduit provided with a control-member, the combination, of the conduit with a throttling member therein, an inverted submerged vessel, a communication between the interior thereof and said conduit, means for balancing said vessel according to the gas-pressure within it, an automatic closing valve for the conduit, a support so arranged as to be adapted to hold said valve in open position, a weighted lever held in stable equilibrium and being so arranged as to be adapted to be released by said submerged vessel when the pressure in the said conduit falls below a predetermined height, and to release in its turn said support, substantially as set forth.

In testimony whereof I affix my signature in presence of two witnesses.

BRUNO VERSEN.

Witnesses:
HENRY W. HALLE,
ALBERTINE PORGER.